United States Patent [19]

Buzzi

[11] 4,029,121
[45] June 14, 1977

[54] VALVE CONSTRUCTION FOR CONTROLLING A LIQUID SUPPLY TO ONE OR MORE DISCHARGE POINTS

[75] Inventor: Günter Buzzi, Schiltach, Schwargwold, Germany

[73] Assignee: Fa.Hans Grohe KG., Germany

[22] Filed: Sept. 2, 1975

[21] Appl. No.: 609,484

[30] Foreign Application Priority Data

Sept. 5, 1974 Germany .......................... 2442482

[52] U.S. Cl. ............................... 137/545; 137/606; 137/614.2; 210/234
[51] Int. Cl.² ........................................ F16K 19/00
[58] Field of Search ........... 210/234, 235; 137/545, 137/606, 614.2

[56] References Cited

UNITED STATES PATENTS

| | | | |
|---|---|---|---|
| 1,592,835 | 7/1926 | Mock et al. ..................... | 210/234 |
| 3,283,907 | 11/1966 | Whiting ............................. | 210/234 |
| 3,363,762 | 1/1968 | Ensign ............................. | 210/234 X |
| 3,485,371 | 12/1969 | Costantini ...................... | 210/234 X |

*Primary Examiner*—Robert G. Nilson
*Attorney, Agent, or Firm*—McGlew and Tuttle

[57] ABSTRACT

A valve system for controlling the water supply to at least one discharge line comprises a housing having an inlet passage, with at least one discharge passage spaced from the inlet passage and with both passages connecting into a flow control chamber. A closure member is movable in the flow control chamber and it has respective opposite closing surfaces adjacent the respective ends thereof and it is guided in the housing control chamber by a guide ring. The guide ring has an annular seat surface at each end which are cooperable with the respective closing surfaces. A tubular screen is arranged coaxially with and surrounds a portion of the control member, and when the closure surfaces are moved off the valve seats, the flow from the inlet around a closure member and through the screen to an electromagnetic valve flow passage may be carried out. Flow through the electromagnetic valve flow passage is controlled by an electrically operated valve. The flow control chamber opens upwardly in the housing and it is closed by a threaded screw cap which in turn has a central threaded bore which receives a set screw. Both the screw cap and the set screw are coaxially arranged with respect to the tubular screen and the closure member and the set screw may be adjusted axially to bear against the closure member in an end position.

9 Claims, 7 Drawing Figures

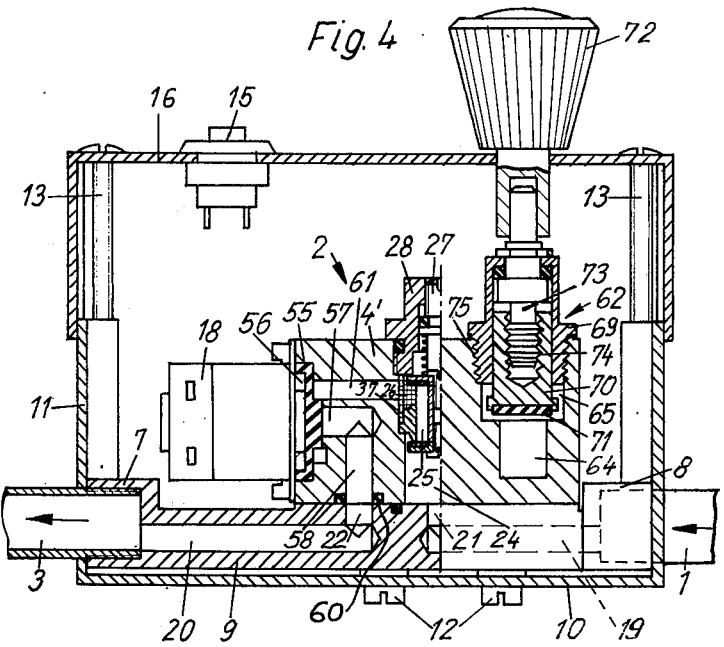
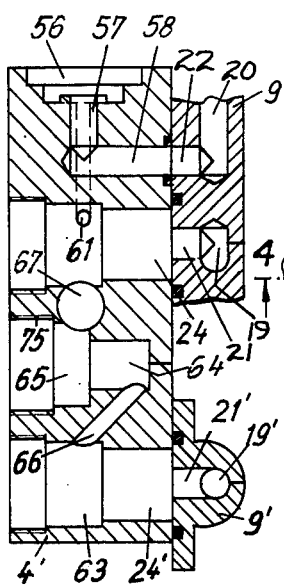
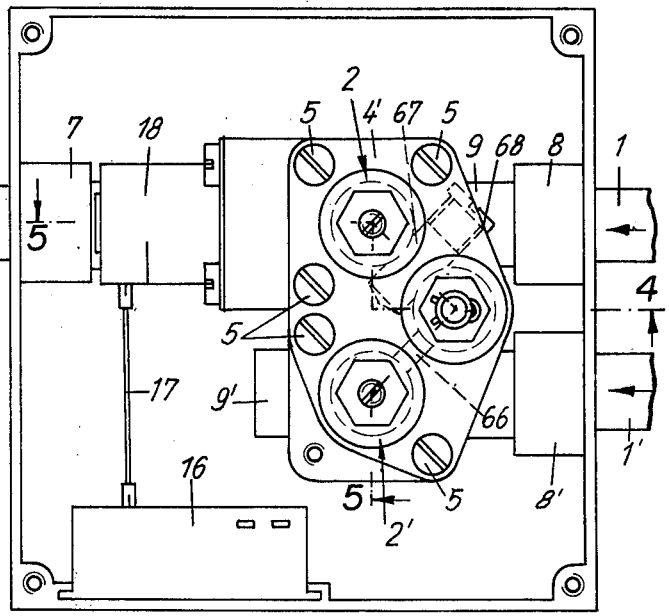

VALVE CONSTRUCTION FOR CONTROLLING A LIQUID SUPPLY TO ONE OR MORE DISCHARGE POINTS

FIELD AND BACKGROUND OF THE INVENTION

This invention relates in general to the construction of flow control devices and, in particular, to a new and useful valve arrangement for controlling the water supply to one or more discharge points such as in a shower or similar construction and which may be supplied through two lines conducting water with different temperatures and in which at least one electrically actuable closing valve is provided.

DESCRIPTION OF THE PRIOR ART

In public showers or other water discharge installations of bathing establishments, it is known to interrupt the water supply in regular periods of time by means of valves controlled by a timer, in order to reduce the water consumption. In such cases, the user can start the water supply again by actuating a pushbutton provided near the water discharge device. This pushbutton is a part of a time switch, opening an electromagnetic valve and closing the same automatically again upon expiration of a predeterminable period of time.

Two different modes of operation are possible. In the first one, the valve arrangement equipped with the electromagnetic valve is supplied with hot and cold water separately; the water is mixed in the valve arrangement, and then passes through the electromagnetic valve to the discharge device. In this case, it is possible for the user to control the temperature of the water supplied to the discharge device in accordance with his need. In the second mode of operation, water which is already pre-tempered is supplied to the valve arrangement and in this case, a mixer becomes superfluous.

In either of the aforementioned modes of operation, a dirt trapping sieve must be installed upstream of the electromagnetic valve in order to hold dirt away from the sensitive closure member of the electromagnetic valve. To permit cleaning and replacement, the dirt trapping screen must be easily removable.

Additionally, in the first mode of operation, a crossflow between the two separate hot and cold water supply lines must be prevented, and a means must be provided for controlling the pressure and, if necessary, reducing the rate of flow in the two supply lines in order to equilibrate possible different water pressures.

SUMMARY OF THE INVENTION

The present invention provides a valve arrangement of the type which permits easy access to all parts of the housing. In accordance with the invention, at least one valve screen arrangement is mounted, upstream of the electrically controlled closing valve, in a common housing block which is provided with at least one inlet and one outlet, and comprises, in coaxial relationship, a tubular screen, an axially movable closure member provided with oppositely disposed closing surfaces and cooperating with a valve seat which is effective in both axial directions, with a screw cap retaining the screen and a set screw acting on the closure member from the outlet side.

Such a valve arrangement has not only the advantage of having all of the parts necessary for an impeccable function concentrated in a very small space in a common block, but, in addition, the advantage of being able, with a single member, namely, the closure member axially movable in both directions, to perform, inter alia, the following functions:

1. It serves to the pre-control at unequal water pressures in the hot and cold water lines or to the desired adjustment of the rate of flow;
2. It serves as a check valve, preventing the crossflow between hot and cold water;
3. It may serve as a shut-off valve if, for example, one of the water discharge equipments is to be eliminated; and
4. It serves as an automatic shut-off valve if, for example, the installed dirt trapping screen is to be cleaned or replaced. This is very important, particularly in cases where a plurality of water discharge equipment is connected in series to a common supply source and only one of them, i.e., where the dirt trapping screen is to be removed, is to be separated from the water supply while the water continues to be supplied to all of the other water discharge equipment.

Since, in most cases, such valve arrangements are accommodated in concealed housings, it is advantageous, in order to ensure a satisfactory access to the parts both during the installation and for maintenance, to arrange the outlet of the housing block to extend parallel to the axis of the inlet or inlets and at the side which is remote from the screw cap or caps. This ensures the accessibility of all operational parts from the side of the front plate of the concealed housing. Both the individual parts accommodated in the housing block and the housing block itself can be mounted or removed from the front side. This substantially facilitates the work during installation as well as in the maintenance.

While only a single valve screen arrangement is needed in the housing block in the mode of operation with pretempered water, in the other mode of operation in which cold and hot water is supplied separately, it is provided, in accordance with a development of the invention, that in a common housing block, two valve screen arrangements having separate inlets are received and disposed side-by-side in parallel relationship and that these two arrangements are connected to each other, at their outlet sides, through a control valve which is provided with an actuating member at the side of the screw cap. In this case again, the rugged construction and good accessibility of the individual parts, as well as the possibility of a simple installation of the entire housing block from the front side are ensured.

According to a further development of the invention, the closing valve, which is designed as an electromagnetic diaphragm valve, is integrated within the common housing block so as to have its diaphragm extending in a plane which is parallel to the axis of the valve screen arrangement and to be connected, at its inlet side, to the adjacent valve screen arrangement through passages which are substantially perpendicular to the axis of the valve screen arrangement. An outlet bore of the housing block opens approximately at a right angle into the outlet passage of the diaphragm valve which operates in a toroidal cavity.

Aside from the advantage that with such an integration of the electromagnetic valve within the common housing block, the entire unit becomes even more compact and it is thereby possible to preassemble the housing block with all its parts including the electromagnetic valve as a complete assembly unit and to install it as such or, in case of a failure, to remove it and replace it by a new one.

Accordingly, it is an object of the invention to provide an improved valve arrangement for controlling the water supply to at least one discharge line which comprises a housing which has an inlet passage and at least one discharge passage which connect respective ends of a flow control chamber in which a closure member is movable and wherein the flow control member comprises separate opposite closing surfaces adjacent the ends thereof and it is guided in a ring member which has a seat defined at each end which is engageable with respective closing surfaces for closing off the flow passage in the flow control chamber and which further includes a screen which is arranged in the flow passage before an electromagnetic valve and which includes a removable screw cap closing the flow control chamber and arranged coaxially with the screen and the closure member and having a set screw adjustably threaded therein which is also coaxially arranged which bears against the closure member in a limit position.

A further object of the invention is to provide a valve arrangement for controlling a liquid supply which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

BRIEF DESCRIPTION OF THE DRAWINGS

In the drawings:

FIG. 3 is a top plan view of a combined valve arrangement in accordance with the invention, received in a concealed housing;

FIG. 4 is a sectional view taken along the line 4—4 of FIG. 3;

FIG. 5 is a sectional view taken along the line 5—5 of FIG. 3 which also corresponds to the structure shown in FIG. 2;

DESCRIPTION OF THE PREFERRED EMBODIMENTS

Figure 2:
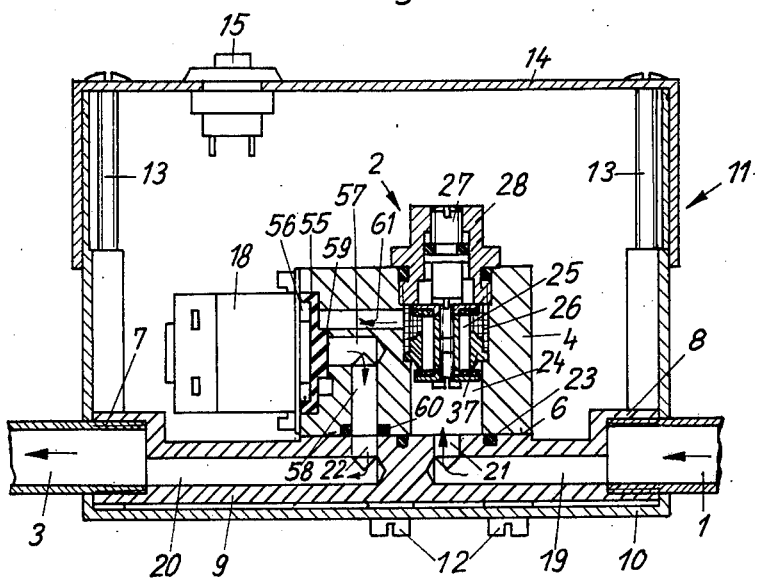
FIG. 2 is a sectional view taken along the line 2—2 of FIG. 1.

Referring to the drawings in particular, the invention embodied therein, comprises a valve arrangement for controlling a liquid supply to at least one discharge line.

Figure 1:
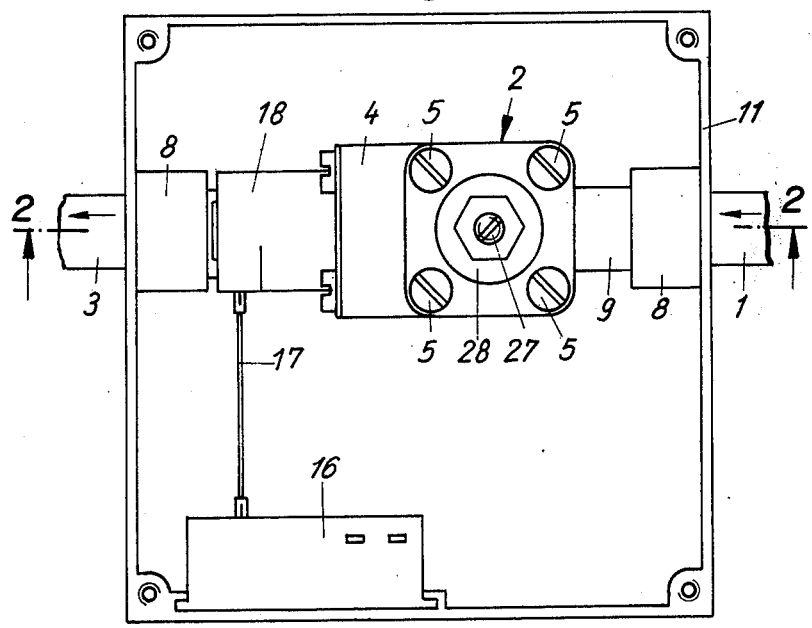
FIG. 1 is a top plan view of a simple embodiment of the invention with the valve arrangement received in a concealed housing.

The embodiment of FIGS. 1 and 2 shows a simple design of the inventive valve arrangement in which only one supply line 1 is provided through which pre-tempered water is supplied. After the water passes through the valve arrangement 2, it flows through a supply line 3 to which one or more showers or other outlets may be connected. Valve arrangement 2 comprises a housing block 4 which is secured, by its flat underside and by means of screws 5, to a plane seat surface 6 of a tubular piece 9 having two ends provided with threaded sockets 7 and 8. The supply line 1 and the discharge line 3 are screwed into sockets 7 and 8 respectively of the tubular piece 9. Tubular piece 9 is secured to the bottom 10 of a concealed housing 11 by means of screws 12. Housing 11 comprises a cover 14 which is removably secured thereto by means of screws 13 and in which an electric pushbutton switch 15 is mounted. Switch 15 in intended for actuating an electronic timer 16 which is connected, through electric lines 17, to an electromagnetic valve 18. The hollow of tubular piece 9 is not throughgoing but is formed of two separate, oppositely directed, bottomed holes 19 and 20 which are opened, at their bottoms, by radial cross bores 21 and 22, respectively. Cross bore 21 is surrounded by a sealing ring 23 which is embedded in surface 6 of tubular piece 9. Cross bore 21 opens into a coaxial bore 24 provided in housing block 4. In bore 24 which has a diameter increasing by steps upwardly, the following component parts are mounted in coaxial relationship: a closure member 25 which is movable axially in both directions, a tubular screen 26, a set screw 27 and a screw cap 28.

Figure 7:
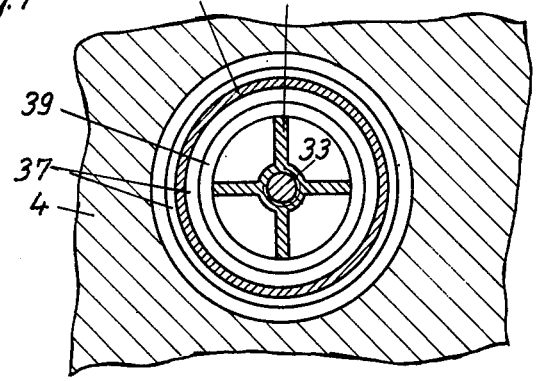
FIG. 7 is a sectional view taken along the line 7—7 of FIG. 6.

Closure member 25 comprises a guide part 29, FIG. 7, having a cross-shaped cross-section and two valve plates 30 and 31 secured to the front sides of guide part 29 by means of screws 32, 33 and having a larger diameter than guide part 29. On their surfaces facing each other, valve plates 30 and 31 are provided with sealing rings 34, 35. Closure member 25 is guided for axial movement in a guide ring 37 which is screwed into an internal thread 36 provided in bore 24 of housing block 4. Guide ring 37 comprises an annular valve seat portion 38 which is formed with two collars 39, 40 projecting in axially opposite directions and against which, in the respective operational positions of closure member 25, the sealing rings 34 or 35 of member 25 can apply for closing the respective passages. Projecting collar 39 forms a circular groove around its outer circumference in which the lower end portion of screen 26 is received. Thread 36 is sealed by means of an O-ring 41. The upper end portion of tubular screen 26 rests against a cylindrical recess 42 of screw cap 28 which is screwed from above into a thread 43 provided in the enlarged portion of bore 24 and is sealed by means of an O-ring 44. Screw cap 28 comprises a cylindrical hollow 45 and, in its top portion, a concentrical, tapped, throughbore 49. In this tapped bore 49, the threaded head 50 of set screw 27 is received. Set screw 27 further comprises a cylindrical guide portion 51 which is provided with an O-ring 52 and by which the set screw is guided in the hollow 45 of screw cap 28, and a pin portion 53 limiting the axial movement of closure member 25 in the direction of arrow 54.

An electromagnetic valve 18 is integrated within housing block 4 so that its diaphragm 55 is accommodated in a shallow cylindrical valve space 56 and extends in a plane which is parallel to the axis of bore 24. The outlet of electrogmagnetic valve 18 comprises a bottomed bore 57 and a cross-bore 58 opening into this bottomed bore 57. Bore 57 is coaxial of the axis of diaphragm 55 and is provided with a toroidal body or cavity 59. The bore 58 extends at a right angle to the axis of bottomed bore 57 and, therefore, in parallel to the axis of bore 24 and is aligned with cross-bore 22 of tubular piece 9. A sealing ring 60 is provided around bore 58, at the bottom of housing block 4. Bore 24 and valve space 56 are connected to each other by a plurality of passages 61 (FIG. 4), 61' (FIG. 5) extending perpendicularly to bore 24 and are provided next to bottomed bore 57.

Figure 6:
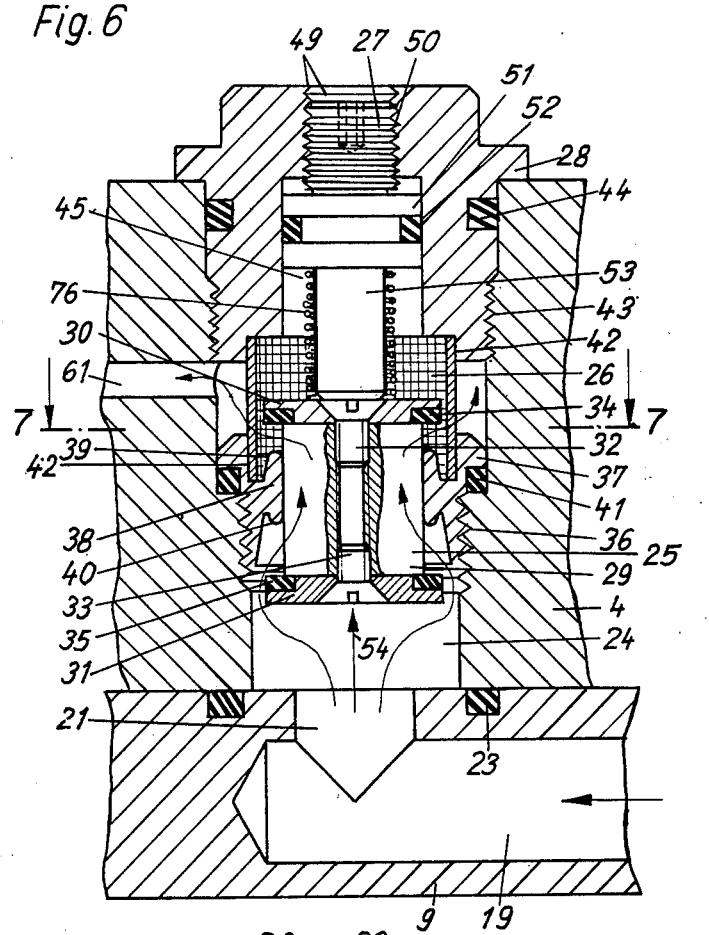
FIG. 6 is a sectional view of a valve screen arrangement in accordance with the invention.

The simple valve arrangement just described with reference to FIGS. 1 and 2 as well as FIGS. 6 and 7 operates as follows:

In the operational position of closure member 25 shown in FIG. 6 and corresponding to a free passage of water, a certain sectional area of flow upstream is cleared between the lower valve plate 31 and the guide ring 37, which sectional area is predetermined by the chosen depth of engagement of set screw 50 and can be varied, in accordance with the water pressure, by changing the position of set screw 50. With the electromagnetic valve 18 open, the pre-tempered water supplied through line 1 passes through bottomed hole 19, cross-bore 21, lower portion of bore 24, guide ring 37 and screen 26, as well as through passages 61, valve space 56 of electromagnetic valve 18, bottomed bore 57, bore 58, cross-bore 22 and bottomed hole 20 into the discharge line 3. At the same time, the flow pressure of the inflowing water presses the closure member 25 into contact with pin 53 of set screw 27, whereby, the position of guide part 29 of the closure member is stabilized. As soon as electromagnetic valve 18 is closed by deenergizing its coil (not shown), the water passage is stopped.

If, for cleaning the screen 26, screw cap 28 along with set screw 50 is unscrewed from housing block 5, the water pressure present in bore 24 and acting also in the direction of arrow 54 causes the lower valve plate 31 of closure member 25 to apply against the lower collar 40 of guide ring 37 thereby preventing further flow of water therethrough. Thus, closure member 25 serves as an automatic shut-off valve and it is not necessary to shut off the water supply separately. In addition, closure member 25 has the function of a check valve, that is, in cases where water would tend to flow in the opposite direction, as will be explained in more detail hereinafter.

The embodiment of FIGS. 3, 4 and 5 shows a combined valve arrangement which is suitable for mixing separately supplied cold and hot water. In this embodiment, two valve screen arrangements of the kind shown in the sectional views of FIGS. 2 and 6 are provided side-by-side in spaced relationship in a common housing block 4' and are connected to each other by a mixer valve 62 which is mounted in the same housing block 4'. As far as the same parts are provided as in the embodiment of FIGS. 1, 2, 6 and 7, the same reference numerals are used for those parts in FIGS. 3, 4 and 5. Here, supply line 1 conveys hot water. Next to it, a second supply line 1' for cold water is provided which is connected to a tubular piece 9' analogously comprising a threaded flange 8', a bottomed hole 19' and a cross-bore 21'. Cross-bore 21' (FIG. 5) opens into a bore 24' of housing block 4' in which the second valve screen arrangement 2' is mounted. For reasons of clarity, in the sectional view of FIG. 5, the functional parts mounted in the bores are not shown, but only the connecting passages therebetween. An obliquely extending connecting passage 66 is provided between the screen space 63 of bore 24' and the lower part 64 of a bottomed bore 65 accommodating the mixer valve 62, and a communication in the form of a cross-bore 67 is provided between the middle part of bottomed bore 65 and the screen space of bore 24. The cross-bore 67 is closed to the outside by means of a screw plug 68. The communication between the screen space of bore 24 and the valve space 56 of electromagnetic valve 18 is established, in the same manner as in the embodiment of FIGS. 1, 2, 6 and 7, by transversely extending passages 61.

Mixer valve 62 comprises a piston 70 guided for axial movement in a screw sleeve 69 and carrying a sealing disc 71 having a diameter which is larger than the diameter of the lower part 64 of bottomed bore 65 of housing block 4'. A threaded spindle 73 to which a manually operated knob 72 is non-rotatably secured and which is mounted in threaded sleeve 69 for rotation but not for axial displacement engages an internal thread 74 of piston 70 and serves for axial displacement thereof. Threaded sleeve 69 is firmly screwed into bottomed bore 65 of housing block 4', by means of a thread 75. Depending on the axial position of piston 70 of mixer valve 62, more or less of the cold water can be admixed, through connecting passage 66 and crossbore 67, to the warm or hot water flowing through bore 24 of valve screen arrangement 2 and, thereby, the desired tempering can be obtained.

In such a combined valve arrangement, which serves at the same time as a mixer, an additional importance is attached to the closure member 25 in connection with the set screws 50 of the two valve screen arrangements 2 and 2', insofar as an exact mixing temperature is obtainable by means of mixer valve 62 only after an equalization or preadjustment of the water pressures in the two supply lines 1 and 1' which, usually, are different, i.e., upon an adjustment of the two closure members 25 to the correct sectional areas of flow, by means of set screws 50. In this respect, the aforementioned check valve function of the two closure members 25 is of great importance since, during normal operation of such an installation, it happens again and again that the water pressure in the one or the other supply line 1 or 1' varies for shorter or longer periods of time which may result in cross flows which must be prevented. To improve the check valve function of one of the closure members 25 which is mounted in the line affected, by experience, with pressure drops most frequently, a relatively soft compression spring 76 is provided which in addition surrounds the respective pin portion 53 of set screw 50 so that this closure member 25 is permanently biased against the normal flow direction. From experience, it is known that the temporary pressure drops are more frequent in hot water conduits (supply line 1), than in cold water lines, such as line 1', so that, in the present example, the compression spring 76 is mounted in the valve screen arrangement 2. If such a pressure drop would occur in supply line 1, the cold water supplied under higher pressure would penetrate with the electromagnetic valve 18 both closed and opened, in a direction opposite to the normal flow into line 1, if not for the closure member 25 in valve screen arrangement 2, which, in response, would move in the direction opposite to arrow 54 thereby producing the checking effect. That is, due to this reverse movement, valve plate 30, by its sealing ring 34, applies against the upper collar 39 and, consequently, prevents the so-called cross-flow.

All of the other properties and advantages mentioned in connection with the embodiment according to FIGS. 1, 2, 6 and 7 are to be found in this design as well.

The rugged construction and the possibility of simple assembling and disassembling may be learned from the drawings without difficulty. Upon removal of the cover 14 of the housing, both the set screws 30 and the screw caps 28, as well as the fastening screws 5, are easily accessible from the front side of the housing. The electromagnetic valve 18 can be assembled with the housing block 4 or 4' in advance and mounted along with the latter on the tubular piece of pieces 9 and 9'.

While specific embodiments of the invention have been shown and described in detail to illustrate the application of the principles of the invention, it will be understood that the invention may be embodied otherwise without departing such principles.

What is claimed is:

1. A valve arrangement for controlling the water supply to at least one discharge line, comprising housing means having an inlet passage, at least one discharge passage spaced from said inlet passage and having a flow control chamber between and in communication with said inlet and discharge passages, a closure member movable in said control chamber having relatively fixed respective opposite spaced apart closing surfaces adjacent respective ends thereof, guide ring means in said control chamber for said closure member defining oppositely directed axially spaced seat surfaces, a tubular screen coaxial with and surrounding a portion of said closure member, an electromagnetic valve flow passage connected between said control chamber and said discharge passage, said closure member defining with the interior said flow control chamber, when the closing surfaces are not engaged on said seat surfaces; a flow passage from said inlet passage around one of said closing surfaces through said screen to said electromagnetic flow passage, a screw cap coaxial with said screen and said closure member and engaged with said housing and closing one end of said flow control chamber and holding said screen in said flow control chamber, and a set screw coaxially threaded to said screw cap and being adjustably engageable with said closure member.

2. A valve arrangement for controlling the water supply to at least one discharge line, according to claim 10, wherein said discharge passage is connected to said housing at the side thereof which is opposite to said screw cap.

3. A valve arrangement for controlling the water supply to at least one discharge line, according to claim 1, wherein said housing means includes a block member, a tubular piece connected to said block member and having an inlet blind bore extending inwardly from one side and an outlet blind bore extending inwardly from the opposite side of said tubular piece, said blind bores defining said inlet passage and said discharge passage, respectively, said inlet passage blind bore being connected to said flow control chamber and said discharge passage blind bore being connected to said electromagnetic valve flow passage.

4. A valve arrangement for controlling the water supply to at least one discharge line, according to claim 1, wherein said housing means includes two flow control chambers each having a closure member and a tubular valve screen therein and disposed in parallel relationship side-by-side in a control valve passage connected to each of said two flow control chambers having a control valve therein with an actuating member disposed adjacent the screw caps of each respective flow control chamber.

5. A valve arrangement for controlling the water supply to at least one discharge line, according to claim 1, including an electromagnetic diaphragm valve in said electromagnetic valve flow passage including a diaphragm disposed in said housing in a plane parallel to the axis of said flow control chamber and said tubular screen and including a connecting passage extending between said electromagnetic valve flow passage and said discharge passage which is substantially perpendicular to the axis of said valve screen and a further connecting passage which extends substantially parallel to the axis of said valve screen.

6. A valve arrangement for controlling the water supply to at least one discharge line, according to claim 1, wherein said electromagnetic valve flow passage includes an outlet passage extending laterally from said flow control chamber at the level of said screen, said screw cap having a bottom face adjacent said screen with an inwardly extending cylindrical recess into which said screen extends, the inner end of said cap screw being in substantial alignment with the top of said outlet passages.

7. A valve arrangement for controlling the water supply to at least one discharge line, according to claim 1, wherein said closure member includes an intermediate portion with a plurality of radially extending guide ribs and a closure plate at each end having inwardly and oppositely directed surfaces forming said sealing surfaces which extend radially outwardly beyond the valve seats defined by said guide means, said guide means comprising a ring member located in said housing flow control chamber.

8. A valve arrangement for controlling the water supply to at least one discharge line, according to claim 1, wherein said guide means comprises a guide ring member having an axially extending portion bearing against said closure member for guiding said closure member for movement and having an upper end terminating in a recess into which said screen extends.

9. A valve arrangement for controlling the water supply to at least one discharge line, according to claim 1, wherein said guide means includes a ring having two axially outwardly and oppositely projecting collars, said ring being provided with a threaded exterior which is threaded into the housing in the flow control chamber thereof.

* * * * *